(12) United States Patent
Nishimura

(10) Patent No.: US 7,451,101 B2
(45) Date of Patent: Nov. 11, 2008

(54) METHOD OF AND APPARATUS FOR COMMODITY SELLING INTERMEDIATION, AND COMPUTER PRODUCT

(75) Inventor: Yasuhiro Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 604 days.

(21) Appl. No.: 10/201,970

(22) Filed: Jul. 25, 2002

(65) Prior Publication Data

US 2003/0200154 A1    Oct. 23, 2003

Related U.S. Application Data

(63) Continuation-in-part of application No. 09/961,251, filed on Sep. 25, 2001, now abandoned.

(30) Foreign Application Priority Data

Apr. 25, 2001  (JP) ............................. 2001-128470
Apr. 18, 2002  (JP) ............................. 2002-116247

(51) Int. Cl.
*G06Q 30/00* (2006.01)
(52) U.S. Cl. .......................................... 705/26; 705/37
(58) Field of Classification Search ................... 705/26
See application file for complete search history.

(56) References Cited

U.S. PATENT DOCUMENTS 6,954,736 B2 * 10/2005 Menninger et al. ............ 705/28

2002/0069115 A1 * 6/2002 Fitzpatrick ................... 705/26

FOREIGN PATENT DOCUMENTS

| JP | 05-130246 | 5/1993 |
| JP | 07-037167 | 2/1995 |
| JP | 10-063725 | 3/1998 |
| JP | 10-063749 | 3/1998 |
| JP | 11-003489 | 1/1999 |
| JP | 11-252533 | 9/1999 |
| JP | 2000-048074 | 2/2000 |
| JP | 2000-148848 | 5/2000 |

OTHER PUBLICATIONS

Morgenstern, Steve, Future Tech Reality Check.(Industry Trend or Event), Home Office Computing, 19, 46, Apr. 2001, downloaded from Dialog Web on Mar. 2, 2008.*
Japanese Office Action for corresponding Application No. 2002-116247 dated Jan. 16, 2007.
"How to Use Internet at Lower Rates", Nikkei Zeroone, No. 39, p. 23, Nikki Home Publishing, Inc., Aug. 1, 1999.
Japanese Office Action for corresponding Japanese Application No. 2002-116247 dated Jun. 19, 2007.
"Principles of Internet marketing", Hanson Ward, Nikkei Inc., Feb. 5, 2001, First Edition, pp. 426-434.
"Internet Business Illustrated 2001", Yoshiya Teramoto, Toyo Keizai, Inc., Nov. 30, 2000. pp. 127-130.

* cited by examiner

*Primary Examiner*—James Zurita

(57) ABSTRACT

The commodity selling intermediation apparatus includes a main control unit that causes a customer to input order information related to a plurality of commodities, compares totals of the prices of the plurality of ordered commodities in the shops with each other with reference to a shop commodity information database to show the customer the totals, causes the customer to select one of the shops as a selling agent, and places an order to the shop selected by the customer through a network on the basis of order contents of the commodities.

6 Claims, 20 Drawing Sheets

FIG.2

| JAN CODE | TRADE NAME | MAKER CODE | MANU-FACTURER'S RECOMMENDED RETAIL PRICE | COMMODITY IMAGE | COMMODITY CATEGORY CODE | COMMODITY SIZE | COMMODITY WEIGHT | COM-BINATION FLAG | QUANTITY |
|---|---|---|---|---|---|---|---|---|---|
| 4931293571 1 | PAPER DIAPER S | M0001 | 2300 | km.gif | C0001 | 20 | 0.5 | 0 | 1 |

| SHOP CODE | ID OF PERSON IN CHARGE | SECTION-IN-CHARGE NAME | PERSON-IN-CHARGE NAME | TELEPHONE NUMBER | E-MAIL |
|---|---|---|---|---|---|
| C0001 | R0001 | ELECTRONIC COMMERCE SECTION | TARO NIPPON | 03-5555-6666 | info@xxx.com |

| SHOP CODE | JAN CODE | SELLING PRICE | UPDATE DATE | THE NUMBER OF STOCKS | ORDER FLAG |
|---|---|---|---|---|---|
| C0001 | 493132935711 | 1800 | 2001/3/1 | 500 | 1 |

| SHOP CODE | MUNICIPAL CODE | TRANSPORTATION FEE | TRANSPORTATION POSSIBLE/ IMPOSSIBLE FLAG |
|---|---|---|---|
| C0001 | 320001 | 560 | 1 |

FIG.9

| ORDER NUMBER | INPUT TIME AND DATE | CUSTOMER ID | SHOP CODE | CUSTOMER MUNICIPAL CODE | SCHEDULED DATE FOR COLLECTION | SCHEDULED TIME AND DATE FOR DELIVERY | TOTAL OF PRICES OF COMMODITIES | TOTAL SIZE OF COMMODITIES |
|---|---|---|---|---|---|---|---|---|
| 0101 | 2001/3/3 08:02 | 123456 | C0001 | 035648 | 2001/4/10 13-14 | 2001/4/12 9-10 | 2480 | 100 |

670

| TOTAL WEIGHT OF COMMODITIES | FORWARDING AGENT CODE | TRANSPORTATION FEE | REFERENCE |
|---|---|---|---|
| 100 | T0001 | 400 | xxxx |

FIG.10

| ORDER NUMBER | JAN CODE | SELLING PRICE | COMMODITY SIZE | COMMODITY WEIGHT |
|---|---|---|---|---|
| 0101 | 4931329335712 | 1800 | 30 | 0.5 |
| | | | | |

| ORDER NUMBER | SHOP MUNICIPAL CODE | FORWARDING AGENT CODE | SERVICE CODE | TRANSPORTATION FEE | SCHEDULED TIME AND DATE FOR COLLECTION | SCHEDULED TIME AND DATE FOR DELIVERY | REFERENCE |
|---|---|---|---|---|---|---|---|
| 0101 | 654321 | T0001 | S0001 | 400 | 2001/4/10 13-14 | 2001/4/12 9-10 | XXXX |
| | | | | | | | |

| CUSTOMER ID | PASSWORD | NAME | ADDRESS | TELEPHONE NUMBER | CUSTOMER MUNICIPAL CODE | E-MAIL |
|---|---|---|---|---|---|---|
| 12345 | 7569a | ICHIRO SUZUKI | 2-2-2 OTEMACHI CHIYODA-KU, TOKYO | 03-3548-2222 | 035648 | Ichi@fuji |
| | | | | | | |

| FORWARDING AGENT CODE | NAME OF FORWARDING AGENT | ADDRESS | TELEPHONE NUMBER | SHOP MUNICIPAL CODE | CUSTOMER MUNICIPAL CODE | SIZE | WEIGHT | TRANSPORTATION FEE |
|---|---|---|---|---|---|---|---|---|
| T0001 | FORWARDING AGENT A | XXX, TOKYO | 03-2345-6789 | 654321 | 035648 | 100 | 2 | 400 |
| | | | | | | | | |

| TRADE NAME | JAN CODE | MANUFACTURER'S RECOMMENDED RETAIL PRICE | ORDER | QUANTITY |
|---|---|---|---|---|
| PAPER DIAPER S | 4931329335711 | ¥2,000- | ☐ | ☐ |
| PAPER DIAPER M | 4931329335712 | ¥2,200- | ▶ | 1 ▶ / 2 / 3 |
| PAPER DIAPER L | 4931329335713 | ¥2,800- | ☐ | ☐ |
| PAPER OF Z CORPORATION | 495426805416 | ¥100- | ☐ | ☐ |
| FIVE SETS OF PAPER OF Z CORPORATION | 495426805416 ×5 | ¥500- | ☐ | ☐ |
| PAPER OF Y CORPORATION | 4964368805420 | ¥100- | ☐ | ☐ |
| FIVE SETS OF PAPER OF Y CORPORATION | 4964368805420 ×5 | ¥500- | ☐ | ☐ |

THE COMMODITY WILL BE PURCHASED

FIG.17

|  | | Manufacturer's Recommended Retail Price | P SUPERMARKET | S STORE | Q DRUG CHAIN STORE |
|---|---|---|---|---|---|
| PAPER DIAPER M | 4931329357 1 2 | ¥2,300— | ¥2,*— | ¥1,*— | ¥2,***— |
| FIVE SETS OF PAPER OF Z CORPORATION | 4954268054 16 ×5 | ¥550— | ¥**— | ¥— | ¥**— |
| TOTAL | | ¥2,850— | ¥2,580— | ¥2,480— | ¥2,470— |

※INTENTIONALLY NOT DISPLAYED

[PURCHASE COMMODITY IN THIS SHOP] 821
[PURCHASE COMMODITY IN THIS SHOP] 822
[PURCHASE COMMODITY IN THIS SHOP] 823

| PAPER DIAPER M | 4931329357122 | MANUFACTURER'S RECOMMENDED RETAIL PRICE ¥2,300— | S STORE ¥1,***— |
|---|---|---|---|
| FIVE SETS OF PAPER OF Z CORPORATION | 4954268054165 ×5 | ¥550— | ¥***— |
| TOTAL | | ¥2,850— | ¥2,480— |

COMMODITY WEIGHT  2kg
COMMODITY SIZE  LENGTH+WIDTH+HEIGHT=100cm

832

CUSTOMER INFORMATION

NAME
ADDRESS
TELEPHONE NUMBER
email
DESIRED DATE FOR DELIVERY
DESIRED TIME

DISPLAY TOTAL OF PRICES INCLUDING DELIVERY FEE — 833

| | MANUFACTURER'S RECOMMENDED RETAIL PRICE | S STORE |
|---|---|---|
| PAPER DIAPER M 4913132935712 | ¥2,300— | ¥1,***— |
| FIVE SETS OF PAPER OF Z CORPORATION 4954268054416 ×5 | ¥550— | ¥****— |
| TOTAL | ¥2,850— | ¥2,480— |

COMMODITY WEIGHT  2kg
COMMODITY SIZE  LENGTH+WIDTH+HEIGHT=100cm

842

CUSTOMER INFORMATION

| NAME | ICHIRO SUZUKI |
| ADDRESS | 2-2-2 OTEMACHI CHIYODA-KU |
| TELEPHONE NUMBER | 03-3548-2222 |
| email | Ichi@fujitsu.com |
| DESIRED DATE FOR DELIVERY | 2001/04/12 |
| DESIRED TIME | 9-11 a.m. |

CONTENT CONFIRMATION

| PAPER DIAPER M | 4931329357125 | MANUFACTURER'S RECOMMENDED RETAIL PRICE ¥2,300— | S STORE ¥1,***— |
|---|---|---|---|
| FIVE SETS OF PAPER OF Z CORPORATION | 4954268054165 ×5 | ¥550— | ¥***— |
| TOTAL | | ¥2,850— ¥2,480— | |

COMMODITY WEIGHT 2kg
COMMODITY SIZE LENGTH+WIDTH+HEIGHT=100cm

CONCERNING DELIVERY

DELIVERY CANNOT BE PERFORMED BY S STORE ITSELF CONNECT TO SYSTEM

850

852

CUSTOMER INFORMATION

NAME ICHIRO SUZUKI
ADDRESS 2-2-2 OTEMACHI CHIYODA-KU
TELEPHONE NUMBER 03-3548-2222
email ichi@fujitsu.com
DESIRED DATE FOR DELIVERY 2001/04/12
DESIRED TIME 9-11 a.m.

CONTENT CONFIRMATION

| | MANUFACTURER'S RECOMMENDED RETAIL PRICE | S STORE |
|---|---|---|
| PAPER DIAPER M  4931329357l2 | ¥2,300— | ¥1,***— |
| FIVE SETS OF PAPER  49542680541 6 ×5 OF Z CORPORATION | ¥550— | ¥****— |
| TOTAL | ¥2,850— | ¥2,480— |

COMMODITY WEIGHT  2kg
COMMODITY SIZE  LENGTH+WIDTH+HEIGHT=100cm

862

CUSTOMER INFORMATION

NAME  ICHIRO SUZUKI
ADDRESS  2-2-2 OTEMACHI CHIYODA-KU
TELEPHONE NUMBER  03-3548-2222
email  Ichi@fujitsu.com
DESIRED DATE FOR DELIVERY  2001/04/12
DESIRED TIME  9-11 a.m.

863  CONCERNING DELIVERY

FORWARDING AGENT A
NEAREST SHOP
OTEMACHI BRANCH
03-1234-5678

KANTO→KANTO 100 ¥700—
COMMODITY PRICE
+DELIVERY FEE=
¥3,180-

[ASSIGN TO THIS AGENT] 864

FORWARDING AGENT B
NEAREST SHOP
KANDA OFFICE
03-3333-3333

CHIYODA-KU→CHIYODA-KU ¥400-
COMMODITY PRICE
+DELIVERY FEE=
¥2,880-

[ASSIGN TO THIS AGENT] 865

FORWARDING AGENT C
NEAREST SHOP
TOKYO BRANCH
03-9999-9999

CHIYODA-KU→CHIYODA-KU ¥700-
COMMODITY PRICE
+DELIVERY FEE=
¥3,180-

[ASSIGN TO THIS AGENT] 866

| | MANUFACTURER'S RECOMMENDED RETAIL PRICE | S STORE |
|---|---|---|
| PAPER DIAPER M   4931329335712 | ¥2,300— | ¥1,***— |
| FIVE SETS OF PAPER   4954268054l6 ×5 | ¥550— | ¥****— |
| OF Z CORPORATION | | |
| TOTAL | ¥2,850— | ¥2,480— |

COMMODITY WEIGHT  2kg
COMMODITY SIZE  LENGTH+WIDTH+HEIGHT=100cm

COMMODITY PRICE
+DELIVERY FEE=¥2,880-

CONCERNING DELIVERY
B FORWARDING AGENT
NEAREST SHOP KANDA OFFICE
03-3333-3333
CHIYODA-KU→CHIYODA-KU ¥400-

CUSTOMER INFORMATION

| NAME | ICHIRO SUZUKI |
|---|---|
| ADDRESS | 2-2-2 OTEMACHI CHIYODA-KU |
| TELEPHONE NUMBER | 03-3548-2222 |
| email | Ichi@fujitsu.com |
| DESIRED DATE FOR DELIVERY | 2001/04/12 |
| DESIRED TIME | 9-11 a.m. |

871

[ FINAL CONFIRMATION ]

| | MANUFACTURER'S RECOMMENDED RETAIL PRICE | S STORE |
|---|---|---|
| | ¥2,300— | ¥1,***— |
| | ¥550— | ¥***— |
| | ¥2,850— | ¥2,480— |

COMMODITY WEIGHT    2kg
COMMODITY SIZE    LENGTH+WIDTH+HEIGHT=100cm

COMMODITY PRICE
+DELIVERY FEE=¥2,880-    AMOUNT TO BE PAID IS ¥2,880-.

883  CONCERNING DELIVERY
     B-FORWARDING AGENT
     NEAREST SHOP KANDA OFFICE
     03-3333-3333
     CHIYODA-KU→CHIYODA-KU ¥400-

884  CARD NUMBER    [    ]
     CARD NAME      [    ]
     TERM OF VALIDITY [    ]

882

CUSTOMER INFORMATION

NAME                   ICHIRO SUZUKI
ADDRESS                2-2-2 OTEMACHI CHIYODA-KU
TELEPHONE NUMBER       03-3548-2222
email                  Ichi@fujitsu.com
DESIRED DATE FOR DELIVERY    2001/04/12
DESIRED TIME           9-11 a.m.

885  [ PAYMENT ]

FIG. 24

| TRANSMITTER | PERSON IN CHARGE OF TRANSPORTATION ARRANGEMENT |
|---|---|
| TITLE | NOTICE OF ARRANGEMENT PERFORMED BY TRANSPORTATION NAVIGATION SYSTEM |
| TRANSMISSION TIME AND DATE | 2001/04/10 9:30 |

Mr. SUZUKI

ACCORDING TO DESIGNATED ASSIGNMENT,
FORWARDING AGENT IN CHARGE:
B FORWARDING AGENT

COMMODITIES BOUGHT IN S STORE
PAPER DIAPER M                            ¥1,980-
FIVE SETS OF PAPER OF Z CORPORATION       ¥500-
TOTAL                                     ¥2,480-

ARE DELIVERED AT DELIVERY FEE: ¥400-

AMOUNT TO BE PAID IS ¥2,880-.
AMOUNT WAS PAID WITH CREDIT CARD.

SCHEDULED DATE FOR DELIVERY IS

2001/04/12
9-11 a.m.

THANK YOU VERY MUCH FOR YOUR PURCHASE.

WE HOPE YOU WILL HONOR TRANSPORTATION NAVIGATION WITH YOUR PATRONAGE.

THE NUMBER OF PRIVILEGED MILES AT PRESENT TIME IS 18 MILES.

| TRANSMITTER | PERSON IN CHARGE OF TRANSPORTATION ARRANGEMENT |
|---|---|
| TITLE | NOTICE OF DELIVERY DELAY CAUSED BY TRANSPORTATION NAVIGATION SYSTEM |
| TRANSMISSION TIME AND DATE | 2001/04/12  7:30 |

Mr. SUZUKI

CONCERNING COMMODITY IN S STORE
FORWARDING AGENT IN CHARGE:
B FORWARDING AGENT
NEAREST SHOP
OTEMACHI BRANCH  03-1234-5678
TRANSPORTATION FEE: KANTO→KANTO  ¥400

WE COMPLETED CORRECTION AT DESIGNATED TIME,
ON SCHEDULE.

FORWARDING AGENT IN CHARGE:
A FORWARDING AGENT
NEAREST SHOP
YOKOHAMA-NISHI BRANCH  045-123-5678
ALTHOUGH YOUR COMMODITY ARRIVED AT THE DELIVERY SHOP,
YOUR COMMODITY WILL BE DELIVERED ONE HOUR BEHIND SCHEDULE BECAUSE OF
TRAFFIC JAM.
CHANGED TIME AND DATE FOR DELIVERY ARE 11:00, 2001/04/12.
I AM SORRY, PLEASE EXCUSE ME FOR DELAY.

TRANSPORTATION NAVIGATION SYSTEM
PERSON IN CHARGE OF TRANSPORTATION ARRANGEMENT
ISHII  03-3548-3333
ishii@tr-navi.com DELIVERY CONTENT
- - - - - - - - - - - - - - - - - - - - - - - - - - - - - - - - - - - - - - - - - - - -
DEPOSITORY:XXX, TOKYO
03-3548-4343
S STORE

895

METHOD OF AND APPARATUS FOR COMMODITY SELLING INTERMEDIATION, AND COMPUTER PRODUCT

CROSS-REFERENCE TO RELATED APPLICATIONS

This application is related to and is a Continuation-In-Part, claiming priority to U.S. patent application entitled METHOD OR AND APPARATUS FOR COMMODITY SELLING INTERMEDIATION, AND COMPUTER PRODUCT, having Ser. No. 09/961,251, by Fujitsu Limited, Kawasaki, Japan, filed on Sep. 25, 2001 and incorporated by reference herein. This application also claims the benefit of Japanese Patent Application No. 2001-128470, filed on Apr. 25, 2001 and Japanese Patent Application No. 2002-116247, filed on Apr. 18, 2002, the disclosures of which are incorporated by reference herein.

BACKGROUND OF THE INVENTION

1. Field of the Invention

The present invention relates to a technology which can improve the facilities for customers when a plurality of commodities are purchased on an on-line system and which can contribute to a reduction in purchase price.

2. Description of the Related Art

In recent years, with the development of the internet, on-line shopping services in which commodities are purchased through the internet have become popular. For this reason, in a company which develops on-line shopping, more development is desired in the facilities of on-line shopping, which will become even more widespread in the future.

In a conventional on-line shopping system, a customer accesses an on-line shopping server through the internet to order a desired commodity from a commodity list. When a shop receives this order, the shop assigns delivery of the commodity to a forwarding agent. In this manner, the commodity is delivered to the customer by the forwarding agent several days later. In addition, the purchase price of the commodity is paid on the basis of settlement information input when the order is made.

In the conventional on-line shopping system, when a commodity is single purchased, a consumer compares the selling prices of the commodity in a plurality of on-line shops, and often purchases the commodity having the lowest price. Therefore, from the viewpoint of the purchase of a single commodity, since consumers can easily compare selling prices with each other in the on-line shopping system, it can be said that the on-line shopping system is a method which has high facilities for consumers, and which can allow the purchase of commodities at low prices.

However, since an on-line shop is always compared with other shops with respect to selling prices, the shop may so excessively promote sales in the shop that the shop takes a risk of limitless low-price competition.

In addition, a customer can easily compare the prices of a single commodity. However, in a conventional on-line shopping system, when a consumer purchases a plurality of commodities such as necessities at once, facilities may be poor, and the costs may be high. More specifically, when a plurality of commodities are purchased at once, operations for summing the prices of the plurality of commodities must be respectively performed in shops. Therefore, the operations are very cumbersome for the shops.

For this reason, many consumers always purchase pluralities of commodities in one on-line shop without comparing totals of the prices in multiple shops with each other. Therefore, consumers may let the chance to purchase a commodity at a low cost slip.

In the conventional on-line shopping system, since the shop side has the right to select forwarding agents in the transportation of commodities, shops often assign transportation to the same respective forwarding agents, because of transaction conditions inherent to the shops. However, in recent years, each forwarding agent normally reviews their transportation fee system and service contents to obtain customers. For this reason, there is a risk that a customer may miss a good opportunity to select a forwarding agent which can give a low transportation fee to the customer.

SUMMARY OF THE INVENTION

It is an object of this invention to provide a method of, and apparatus for, commodity selling intermediation which can improve the facilities of a customer when the customer purchases a plurality of commodities on an on-line system, and which can contribute to a reduction in purchase price. It is another object of this invention to provide a computer that contains instructions which, when executed on a computer, realizes the method according to the present invention on the computer.

According to one aspect of this invention, a customer inputs order information related to a plurality of commodities; the commodity selling prices of a plurality of shops is referred to, and totals of the prices of the plurality of ordered commodities in the representative shops are compared with each other, and the totals are displayed to the customer. The customer selects one of the shops as a selling agent. An order is placed to the shop selected by the customer through a network on the basis of order contents of the commodities.

According to another aspect of this invention, order information related to the plurality of commodities designated by the customer is transmitted to a server connected through a network. Commodity selling prices which are transmitted from the server in accordance with the transmitted order information are received in a state in which at least some of the prices of the plurality of commodities are concealed, and the totals of the prices of the plurality of commodities are shown. The received commodity selling prices which have at least some of the prices of the plurality of commodities concealed, and the totals of the prices shown are displayed.

Other objects and features of this invention will become apparent from the following description with reference to the accompanying drawings.

BRIEF DESCRIPTION OF THE DRAWINGS

FIG. 2 is a diagram showing an example of a commodity information database 600 shown in FIG. 1;

FIG. 6 is a diagram showing an example of a person-in-charge-of-shop information database 640 shown in FIG. 1;

FIG. 7 is a diagram showing an example of a shop commodity information database 650 shown in FIG. 1;

FIG. 8 is a diagram showing an example of a shop transportation information database 660 shown in FIG. 1;

FIG. 9 is a diagram showing an example of an order slip header information database 670 shown in FIG. 1;

FIG. 10 is a diagram showing an example of an order slip body information database 680 shown in FIG. 1;

FIG. 11 is a diagram showing an example of a transportation information database 690 shown in FIG. 1;

FIG. 12 is a diagram showing an example of a customer information database 700 shown in FIG. 1;

FIG. 13 is a diagram showing an example of a forwarding agent information database 710 shown in FIG. 1;

FIG. 15 is a diagram showing an example of a commodity list screen 800 in the embodiment;

FIG. 17 is a diagram showing an example of a ship selling price list screen 820 in the embodiment;

FIG. 18 is a diagram showing an example of a customer information input screen 830 in the embodiment;

FIG. 19 is a diagram showing an example of a content confirmation screen 840 in the embodiment;

FIG. 20 is a diagram showing an example of a content confirmation screen 850 in the embodiment;

FIG. 21 is a diagram showing an example of a forwarding agent list screen 860 in the embodiment;

FIG. 22 is a diagram showing an example of a final confirmation screen 870 in the embodiment;

FIG. 23 is a diagram showing an example of a settlement information input screen 880 in the embodiment;

FIG. 24 is a diagram showing an example of an order confirmation mail 890 in the embodiment;

FIG. 25 is a diagram showing an example of a delivery delay mail 895 in the embodiment.

DETAILED DESCRIPTION OF THE PREFERRED EMBODIMENTS

Embodiments of a method of, and apparatus for, commodity selling intermediation, and a computer product according to the present invention will be described below with reference to the accompanying drawings.

Figure 1:
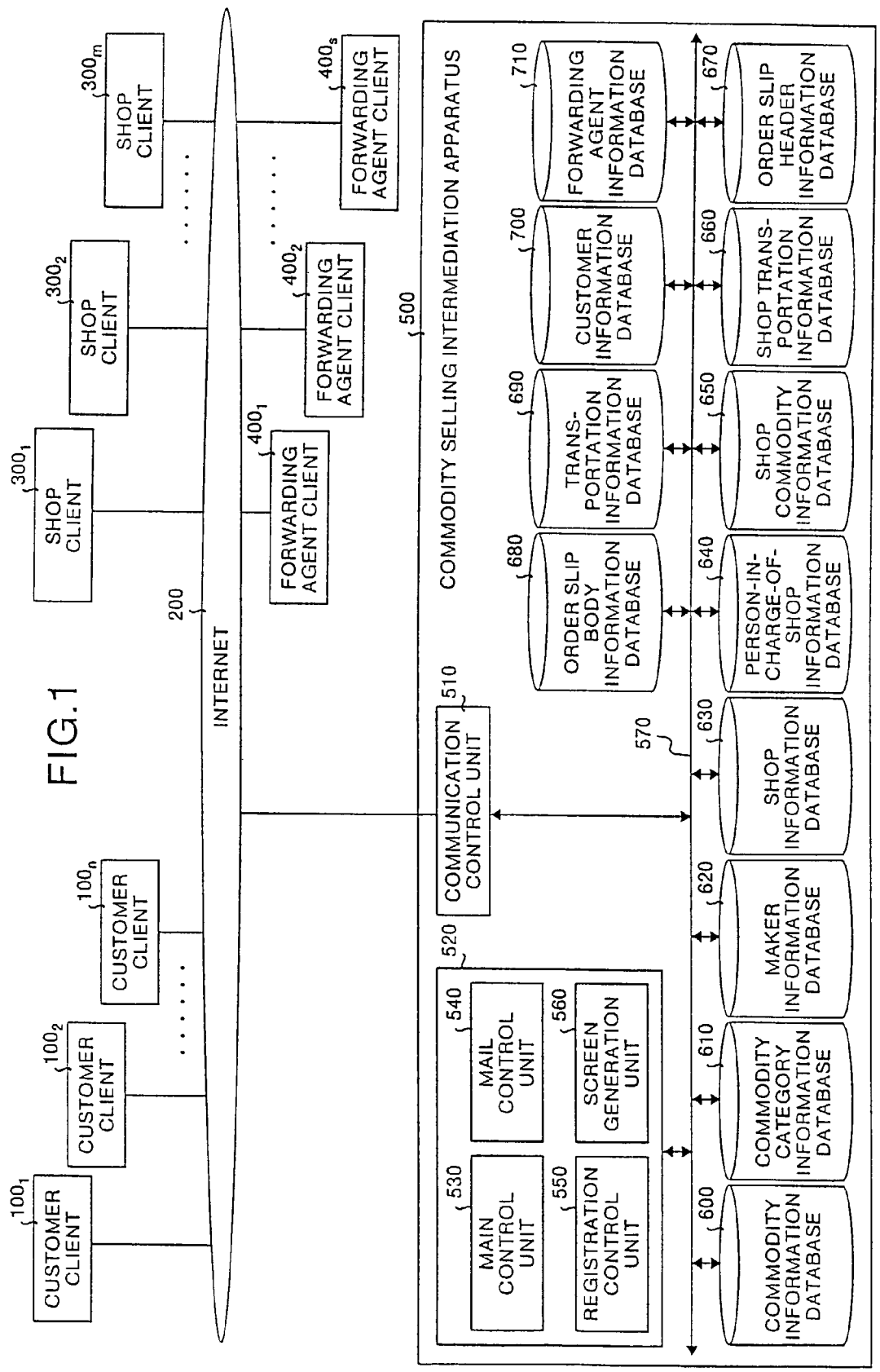
FIG. 1 is a block diagram showing the configuration of an embodiment according to the present invention.

FIG. 1 is a block diagram showing the configuration of an embodiment of the present invention. FIG. 1 shows a commodity selling intermediation system in which customer clients $100_1$ to $100_n$, shop clients $300_1$ to $300_m$, forwarding agent clients $400_1$ to $400_s$, and a commodity selling intermediation apparatus 500 are connected to the internet 200. In FIG. 1, for the sake of convenience in description, communication devices (terminal adapters, routers, fire walls, and the like) required for internet connection are omitted.

The customer clients $100_1$ to $100_n$ are n computers installed on customer sides of shops in which commodities are sold in an on-line system, and access the commodity selling intermediation apparatus 500 (to be described later) through the internet 200 according to the TCP/IP (Transmission Control Protocol/Internet Protocol). Each of the customer clients $100_1$ to $100_n$ is constituted by a computer body, a display, a keyboard, a mouse, and the like.

The customer clients $100_1$ to $100_n$ are used to select the commodities, to input settlement information, and the like. In addition, the customer clients $100_1$ to $100_n$ comprise mailers (not shown) and browsers, respectively. The mailer provides a function for transmitting/receiving electronic mails through a mail server (not shown).

In transmission/reception of electronic mail, SMTP (Simple Mail Transfer Protocol) and POP3 (Post Office Protocol version 3) are used. The browsers are computer programs for browsing various screens (see FIGS. 15 to 23) provided by the commodity selling intermediation apparatus 500.

The shop clients $300_1$ to $300_m$ are m computers installed in shops in which commodities are sold in an on-line system, and access the commodity selling intermediation apparatus 500 through the internet 200 according to the TCP/IP. Each of the shop clients $300_1$ to $300_m$ is constituted by a computer body, a display, a keyboard, a mouse, and the like. The shop clients $300_1$ to $300_m$ are used for registration of commodity information to the commodity selling intermediation apparatus 500, reception of order information, and the like. In this case, in the shop, not only on-line sales of commodities, but also face-to-face sales are performed.

The forwarding agent clients $400_1$ to $400_s$ are s computers installed in forwarding agents, respectively, and access the commodity selling intermediation apparatus 500 (to be described later) through the internet 200 according to the TCP/IP. Each of the forwarding agent clients $400_1$ to $400_s$ is constituted by a computer body, a display, a keyboard, a mouse, and the like.

The forwarding agent clients $400_1$ to $400_s$ are used for registration of forwarding agent information, assignment of transportation, and the like. The forwarding agent is a company for transporting a commodity of a shop, which receives an on-line order of a commodity from a customer, to the customer. When a shop has a unique transportation system, the process of transporting a commodity may be executed on the shop side without assigning transportation to a forwarding agent.

The commodity selling intermediation apparatus 500 comprises a function of showing a plurality of commodities dealt by m shops corresponding to the shop clients $300_1$ to $300_m$ to a customer through the internet 200, and showing the respective totals of the prices of commodities desired to be purchased. In general, the selling prices of the commodities in shops are different from each other depending on buying routes or selling strategies. In this case, the totals of the prices of commodities which are desired to be purchased are different from each other depending on the shops.

The commodity selling intermediation apparatus 500 has a function of causing a customer to select a shop serving as a selling agent from a plurality of shops, and executing an ordering process to the selected shop through the internet 200. In addition, the commodity selling intermediation apparatus 500 has a function of executing a process of requesting a forwarding agent through the internet 200 to transport a commodity from the shop to a client.

In the commodity selling intermediation apparatus 500, a communication control unit 510 controls communication between the customer clients $100_1$ to $100_n$, the shop clients $300_1$ to $300_m$, and the forwarding agent clients $400_1$ to $400_s$ through the internet 200 according to the TCP/IP. A control unit 520 performs various control operations for realizing a commodity selling intermediation function.

More specifically, the control unit 520 is constituted by a main control unit 530, a mail control unit 540, a registration control unit 550, and a screen generation unit 560. The main control unit 530 executes control related to commodity selling intermediation. The detailed operation of the main control unit 530 will be described later. The mail control unit 540 controls transmission/reception of electronic mail. The registration control unit 550 executes control related to information registration of various databases (to be described later).

The screen generation unit 560 generates various screens (to be described later) (see transportation FIGS. 15 to 23). A bus 570 connects the respective units of the commodity selling intermediation apparatus 500.

A commodity information database 600 is a database having commodity information related to all commodities sold through an on-line system by m shops corresponding to the shop clients $300_1$ to $300_m$. More specifically, the commodity information database 600, as shown in FIG. 2, comprises fields including "JAN (Japan Article Number) code", "trade name", "maker code", "manufacturers recommended retail price", "commodity image", "commodity category code", "commodity size", "commodity weight", "combination flag", and "quantity".

The "JAN code" is a code for uniquely discriminating commodities of respective makers, and is information related to a 13-digit number corresponding to a bar code added to each commodity. The "trade name" is information related to the name of a commodity. The "maker code" is information related to codes for distinguishing makers which manufacture commodities from each other. The "the manufacturers recommended retail price" is information related to sticker prices (fixed prices) desired by makers of the commodities. The "commodity image" is information related to image files of the commodities.

The "commodity category code" is information related to the categories of the commodities. The "commodity size" is information related to the sizes (length+width+height) of the commodities. The "commodity weight" is information related to the weights of the commodities. The "combination flag" is a flag representing whether the commodities are constituted by a combination of a plurality of commodities or not. The "quantity" is information related to the number of commodities when a plurality of commodities are sold at once.

Figure 3:
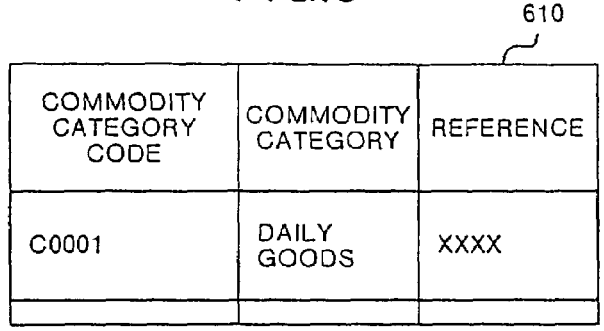
FIG. 3 is a diagram showing an example of a commodity category information database 610 shown in FIG. 1.

Returning to FIG. 1, a commodity category information database 610 is a database in which pieces of commodity category information representing the categories of the commodities are stored. More specifically, the commodity category information database 610, as shown in FIG. 3, comprises fields, or the like, such as "commodity category code" (see FIG. 2) for distinguishing the categories of the commodities from each other, "commodity category" related to the categories, and "reference". The "commodity category code" corresponds to the "commodity category code" of the commodity information database 600.

Figure 4:
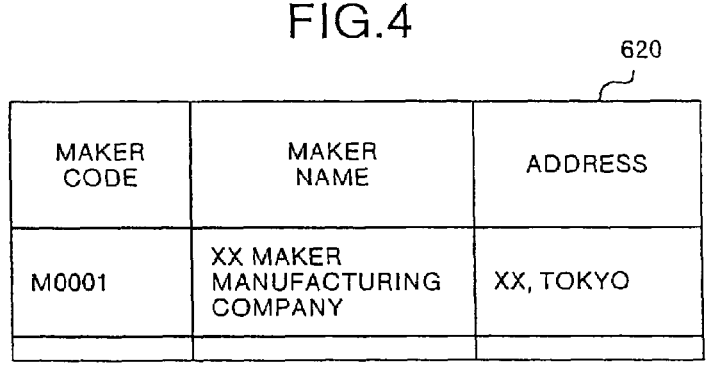
FIG. 4 is a diagram showing an example of a maker information database 620 shown in FIG. 1.

Returning to FIG. 1, a maker information database 620 is a database in which maker information related to the makers of the commodities is stored. More specifically, the maker information database 620, as shown in FIG. 4, comprises fields, or the like, such as "maker code" (see FIG. 2), "maker name" related to the names of the makers, and "address" related to the addresses of the makers. The "maker code" corresponds to the "maker code" of the commodity information database 600.

Figure 5:
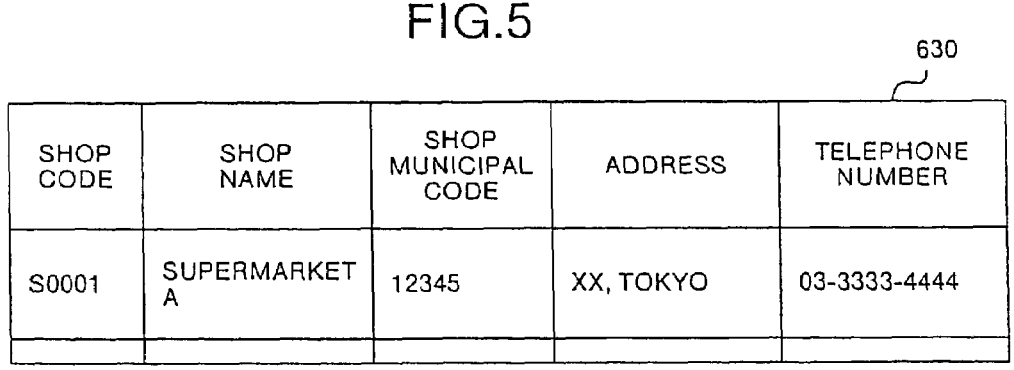
FIG. 5 is a diagram showing an example of a shop information database 630 shown in FIG. 1.

Returning to FIG. 1, a shop information database 630 is a database in which pieces of shop information of shops corresponding to the shop clients $300_1$ to $300_m$ are stored. More specifically, the shop information database 630, as shown in FIG. 5, comprises fields, or the like, such as "shop code" for distinguishing shops from each other, "shop name" related to the names of the shops, "shop municipal code" corresponding to the addresses of the shops, "address" related to the addresses of the shops, and "telephone number" related to the telephone numbers of the shops.

Returning to FIG. 1, a person-in-charge-of-shop information database 640 is a database in which person-in-charge-of-shop information related to persons in charge of on-line sales in the shops is stored. More specifically, the person-in-charge-of-shop information database 640, as shown in FIG. 6, comprises fields, or the like, such as "shop code" for distinguishing shops from each other, "person-in-charge ID" for distinguishing persons in charge of on-line sales in the shops from each other, "section-in-charge name" related to the names of sections in charge of on-line sales, "person-in-charge name" related to the names of persons in charge, "telephone number" related to the telephone numbers of sections in charge, and "E-mail" related to the electronic mail addresses of the persons in charge. The "shop code" corresponds to the "shop code" of the shop information database 630.

Returning to FIG. 1, a shop commodity information database 650 is a database in which shop pieces of commodity information related to pieces of commodity information in shops are stored. More specifically, as shown in FIG. 7, the shop commodity information database 650 comprises fields, or the like, such as "shop code" for distinguishing shops from each other, and "JAN code" (see FIG. 2) which is information related to 13-digit numbers corresponding bar codes added to commodities. The "shop code" corresponds to the "shop code" of the shop information database 630. The "JAN code" corresponds to the "JAN code" of the commodity information database 600.

In addition, the shop commodity information database 650 comprises fields, or the like, such as "selling price" related to the selling prices (actual selling prices) of the commodities in the shops, "update date" related to dates on which pieces of commodity information are updated, "the number of stocks" related to the number of commodities in store in the shops, and "order flag" (1: order is necessary, 0: order is unnecessary) representing whether an order of the commodities to a maker is required or not.

When the number of stocks is equal to or smaller than a preset threshold value, the order is required, and the "order flag" is set to be 1. For example, it is assumed that order point information serving as a reference point at which an order is placed is managed as data corresponding to the threshold value. In this case, the number of stocks and the order point are compared with each other, so that it can be determined whether the order is required or not.

Returning to FIG. 1, a transportation consignment information database 660 is a database in which shop transportation information related to transportation structures (transportation structures obtained by unique transportation systems or transportation structures obtained by assignment to forwarding agents) of commodities in shops is stored. More specifically, the shop transportation information database 660, as shown in FIG. 8, comprises fields, or the like, such as "shop code" for distinguishing shops from each other, "municipal code" representing areas in which the shops can deliver commodities, "transportation fee" related to transportation fees when the unique transportation system is used, and "transportation possible/impossible flag" (1: possible, 0: impossible) representing whether transportation of commodities can be performed by the unique transportation system or not. The "shop code" corresponds to "shop code" of the shop information database 630.

Returning to FIG. 1, an order slip header information database 670 is a database in which order slip header information, related to header information of order slips formed when commodities are ordered by a customer, is stored. More specifically, the order slip header information database 670, as shown in FIG. 9, comprises fields, or the like, such as "order number" added to each order, "input date" related to dates on which pieces of order information are input, "customer ID"

for distinguishing customers (orders) from each other, and "shop code" for distinguishing shops from each other.

In addition, the order slip header information database 670 comprises fields of "customer municipal code" corresponding to the addresses of customers, "scheduled time and data for collection" related to scheduled time and date for collection of commodities by a forwarding agent, "scheduled time and date for delivery" related to desired time and date for delivery of commodities, "total of prices of commodities" related to totals of the prices of the ordered commodities, "total size of commodities" related to a total size of the ordered commodities, "total weight of commodities" related to a total weight of the ordered commodities, "forwarding agent code" for distinguishing forwarding agents in charge of transportation of the commodities from each other, "transportation fee" related to transportation fees paid for transportation of the commodities, and "reference". The "shop code" corresponds to the "shop code" of the shop information database 630.

Returning to FIG. 1, an order slip body information database 680 is a database in which order slip body information related to body information of the order slips is stored. More specifically, the order slip body information database 680, as shown in FIG. 10, comprises fields, or the like, such as "order number" added to each order, the above "JAN code", "selling price" related to selling prices of ordered commodities, "commodity size" related to the sizes of the commodities, and "commodity weight" related to the weights of the commodities. The "JAN code" corresponds to the "JAN code" of the commodity information database 600, and the "JAN code" of the shop commodity information database 650.

Returning to FIG. 1, a transportation information database 690 is a database in which transportation information related to transportation of ordered commodities is stored. More specifically, the transportation information database 690, as shown in FIG. 11, comprises fields of "order number" added to each order, "shop municipal code" related to the addresses of shops with which orders are placed, and "forwarding agent code" for distinguishing forwarding agents in charge of transportation of commodities from each other. The "order number" corresponds to the "order number" of the order slip header information database 670, and the "order number" of the order slip body information database 680.

In addition, the transportation information database 690 comprises fields of "service code" for distinguishing service forms of transportation from each other, "transportation fee" related to the transportation fees of the commodities, "scheduled time and data for collection" related to scheduled time and date on which the forwarding agents collect the commodities from the shops, "scheduled time and date for delivery" related to scheduled time and date for delivering the commodities to customers, and "reference". The "scheduled time and date for collection" corresponds to the "scheduled time and date for collection" of the order slip header information of database 670.

Returning to FIG. 1, a customer information database 700 is a database in which pieces of customer information related to customers corresponding to the customer clients 100₁ to 100ₙ are stored. More specifically, as shown in FIG. 12, the customer information database 700 comprises fields, or the like, such as "customer ID" for distinguishing customers from each shop from each other, "password" used at the access time to the commodity selling intermediation apparatus 500, "name" related to the names of the customers, "address" related to the addresses of the customers, "telephone number" related to the telephone numbers of the customers, "customer municipal code" related to the addresses of the customers, and "E-mail" related to the electronic mail addresses of the customers.

Returning to FIG. 1, a forwarding agent information database 710 is a database in which forwarding agent information related to forwarding agents in charge of transportation of commodities from shops to customers is stored. More specifically, the forwarding agent information database 710, as shown in FIG. 13, comprises fields of "forwarding agent code" for distinguishing the forwarding agents from each other, "forwarding agent name" related to the names of the forwarding agents, and "address" related to the addresses of the forwarding agents.

The forwarding agent information database 710 comprises fields of "telephone number" related to the telephone numbers of the forwarding agents, "shop municipal code" corresponding to the addresses of the shops, "customer municipal code" corresponding to the addresses of the customers, "size" related to the sizes of the commodities (packages), "weight" related to the weights of the commodities (packages), and "transportation fee" related to transportation fees paid when the commodities ("size" and "weight") are transported from an address corresponding to the "shop municipal code" to an address corresponding to the "customer municipal code".

In the forwarding agent information database 710, for each forwarding agent, there exists data the amount of which corresponds to the number of combinations of the "shop municipal code", the "customer municipal code", the "size", and the "weight". In this embodiment, when a forwarding agent provides a plurality of transportation services using different types of trucks or motorcycles (motorcycle service) and the like having different carrying capacities, transportation service codes for distinguishing the transportation services from each other may be given to the forwarding agent information database 710 to set different transportation fees for different transportation services.

The pieces of information of the commodity information database 600, the commodity category information database 610, the transportation fee information database 620, the shop information database 630, the person-in-charge-of-shop information database 640, the shop commodity information database 650, the shop transportation information database 660, and the forwarding agent information database 710 are registered in advance prior to a reception process performed by a customer. The pieces of information of the order slip header information database 670 and the order slip body information database 680 are registered each time an order is placed by a customer. In addition, the information of the transportation information database 690 is registered each time an order including delivery using a forwarding agent is received from a customer.

An operation of this embodiment described above will be described below with reference to the flow chart shown in FIG. 14, and with reference to FIGS. 15 to 24. In step SA1 shown in FIG. 14, the main control unit 530 of the commodity selling intermediation apparatus 500 determines whether an order request (access) is transmitted from one customer client of the customer clients 100₁ to 100ₙ through the internet 200. When the order request is not transmitted, the main control unit 530 determines the decision result as "No" and repeats the process.

For example, when the order request is transmitted from the customer client 100₁, the main control unit 530 determines the decision result in step SA1 as "Yes". In step SA2, the main control unit 530 displays the commodity list screen 800 shown in FIG. 15 on a display unit (not shown) of the customer client $100_1$, with reference to the commodity information database 600 (see FIG. 2).

On the commodity list screen 800, a list of commodities sold by shops in an on-line system is displayed. More specifically, in the commodity list screen 800, trade names, JAN codes, the manufacturers recommended retail prices (fixed prices), check boxes for order, select boxes for the number of ordered commodities, and a commodity selection button 801 are displayed. In step SA3, when the main control unit 530 determines whether the commodity selection button 801 is depressed or not, the main control unit 530 determines the result as "No", and repeats the determination, until the commodity selection button 801 is depressed.

A customer operates the customer client $100_1$ to check a check box for an order corresponding to a commodity to be ordered from the commodity list displayed on the commodity list screen 800. After the quantity is selected, the commodity selection button 801 is depressed. In this manner, the main control unit 530 determines the decision result in step SA3 as "Yes".

Figure 16:
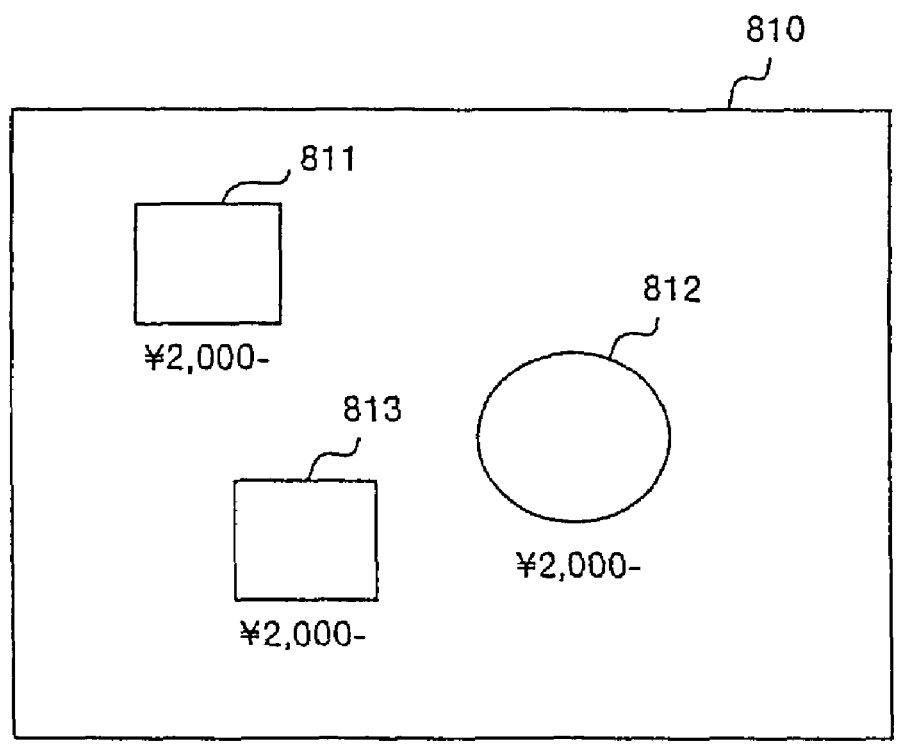
FIG. 16 is a diagram showing an example of a commodity list screen 810 in the embodiment.

In another embodiment, as a screen for causing a customer to select a commodity, in place of the commodity list screen 800 shown in FIG. 15, a commodity list screen 810 shown in FIG. 16 may be used. The commodity list screen 810 is a screen for causing a customer to select a commodity like a leaflet, and the images 811 to 813 of the commodities and the manufacturers recommended retail prices corresponding to the commodities are displayed with an arrangement which is like the arrangement in the space of the leaflet.

Returning to FIG. 14, in step SA4, the main control unit 530 searches the commodity information database 600 (see FIG. 2) and the shop commodity information database 650 (see FIG. 7) for the manufacturers recommended retail price information and selling prices in the shops dealing the commodity by using the JAN code corresponding to a commodity selected on the commodity list screen 800 (see FIG. 15) as a key. On the basis of the searching result, a ship selling price list screen 820 shown in FIG. 17 is displayed on the display unit (not shown) of the customer client $100_1$.

On the ship selling price list screen 820, the manufacturers recommended retail prices of the commodities ordered by a customer, selling prices in the respective shops (in FIG. 14, P supermarket, S store, and Q chain drugstore), totals of prices in the shops, and shop selection buttons 821 to 823 corresponding to the shops are displayed.

Some of the selling prices in each of the shops are intentionally concealed. This is because advantageous commodities (commodities of which discount percentages are high) for the shops and disadvantageous commodities (commodities of which discount percentages are low) for the shops vary due to different buying routes and different selling strategies. More specifically, this has an objective showoff showing a customer company's effort, and a decrease in discount percentage may be presented as a total of prices without showing a customer the above variations. Therefore, the customer can select a shop with which the customer must place an order while considering the comparison result of the totals of the prices of commodities in the shops and the favors of the shops.

Returning to FIG. 14, in step SA5, the main control unit 530 determines whether one shop selection button of the shop selection buttons 821 to 823 shown in FIG. 17 is depressed or not. The main control unit 530 determines the decision result as "No" and repeats the determination, until the shop selection button is depressed.

It is assumed that "S store" (a total of prices: 2480 yen) having the smallest price total is selected as the receiver of an order, from the options of P supermarket, S store, and Q chain drugstore, on the ship selling price list screen 820. In this case, the customer depresses the shop selection button 822 corresponding to the S store. In this manner, the main control unit 530 determines the result in step SA5 shown in FIG. 14 as "Yes".

In step SA6, the main control unit 530 displays a customer information input screen 830 shown in FIG. 18 on the display unit (not shown) of the customer client $100_1$. On the customer information input screen 830, order commodity information 831 related to commodities ordered by a customer, a customer information input column 832 used for input customer information, such as the name of a customer, an address, a telephone number, an electronic mail address, desired time and date for delivery of a commodity, and a total-of-prices display button 833 for displaying a total of prices including a transportation fee are displayed.

Returning to FIG. 14, in step SA7, the main control unit 530 determines whether the total-of-prices display button 833 is depressed or not. The main control unit 530 determines the result as "No", and repeats the determination, until the total-of-prices display button 833 is depressed. After customer information is input to the customer information input column 832 by a customer, when the total-of-prices display button 833 is depressed, the main control unit 530 determines the result in step SA7 as "Yes".

In this embodiment, prior to the display of the customer information input screen 830, a log-in process for inputting customer ID/password of a customer is executed. After customer information is acquired from the customer information database 700 (see FIG. 12) by using the customer ID/password as a key, the customer information may be displayed on the customer information input screen 830.

In step SA8, the main control unit 530 displays a content confirmation screen for causing a customer to confirm order contents and input customer information on the display unit (not shown) of the customer client $100_1$. More specifically, when a transportation possible/impossible flag of the shop transportation information database 660 (see FIG. 8) is "1" (transportation can be performed by a unique transportation system) with respect to a shop serving as the receiver of an order, the main control unit 530 displays the content confirmation screen 840 shown in FIG. 19 on the display unit (not shown) of the customer client $100_1$. On the content confirmation screen 840, order commodity information 841, customer information 842, and a content confirmation button 843 are displayed.

On the other hand, when the transportation possible/impossible flag of the shop transportation information database 660 (see FIG. 8) is "0" (transportation cannot be performed by a unique transportation system, i.e., a transportation structure obtained by a forwarding agent) with respect to a shop serving as the receiver of an order, the main control unit 530 displays a content confirmation screen 850 shown in FIG. 20 on the display unit (not shown) of the customer client $100_1$. On the content confirmation screen 850, order commodity information 851, customer information 852, and a content confirmation button 853 are displayed.

Returning to FIG. 14, in step SA9, the main control unit 530 determines whether the content confirmation button 843 or 853 (FIG. 19 or FIG. 20) is depressed or not. The main control unit 530 determines the result as "No", and repeats the determination, until the content confirmation button 843 or 853 is depressed. The content confirmation screen 850 (see FIG. 20) is displayed on the display unit of the customer client $100_1$. When the content confirmation button 853 is depressed by the customer, the main control unit 530 determines the result in step SA9 as "Yes".

In step SA10, the main control unit 530 displays a forwarding agent list screen 860 shown in FIG. 21 on the display unit (not shown) of the customer client 100₁. More specifically, the main control unit 530 searches the forwarding agent information database 710 by using a shop municipal code (see FIG. 5) of a shop serving as a receiver of an order, and a customer municipal code (see FIG. 12) corresponding to a customer, as keys. The main control unit 530 displays a forwarding agent list screen 860 (see FIG. 21) constituted by order commodity information 861, customer information 862, forwarding agent information 863 based on a searching result, and assignment buttons 864 to 866, on the display unit (not shown) of the customer client 100₁.

The forwarding agent information 863 is constituted by a place to make contact, a transportation route, a transportation fee, and a total of the prices of ordered commodities including a delivery fee for each of forwarding agents (in FIG. 21, forwarding agent A, forwarding agent B, and forwarding agent C) to which transportation of a commodity is assigned. The assignment buttons 864 to 866 are arranged in accordance with the forwarding agents, and are buttons for selecting forwarding agents to which transportation of commodities is assigned from a plurality of forwarding agents in consideration of transportation fees or the like. When the content confirmation button 843 shown in FIG. 19 is depressed, i.e., when a transportation system unique to a selling shop is used, an external forwarding agent need not be selected, and step SA10 and step SA11 are skipped.

Returning to FIG. 14, in step SA11, the main control unit 530 determines whether one assignment button of the assignment buttons 864 to 866 (see FIG. 21) is depressed or not. The main control unit 530 determines the result as "No", and repeats the determination, until the assignment button is depressed. For example, when forwarding agent B is selected by a customer, and when the assignment button 865 is depressed, the main control unit 530 determines the decision result in step SA11 as "Yes".

In step SA12, the main control unit 530 displays a final confirmation screen 870, as shown in FIG. 22, on the display unit of the customer client 100₁. On the final confirmation screen 870, order commodity information, customer information, forwarding agent information, amount-of-paid information, and a final confirmation button 871 are displayed. The final confirmation screen 870 is a screen for causing a customer to finally confirm an order. In this embodiment, the association or the like of a forwarding agent may be displayed on the final confirmation screen 870.

Figure 14:
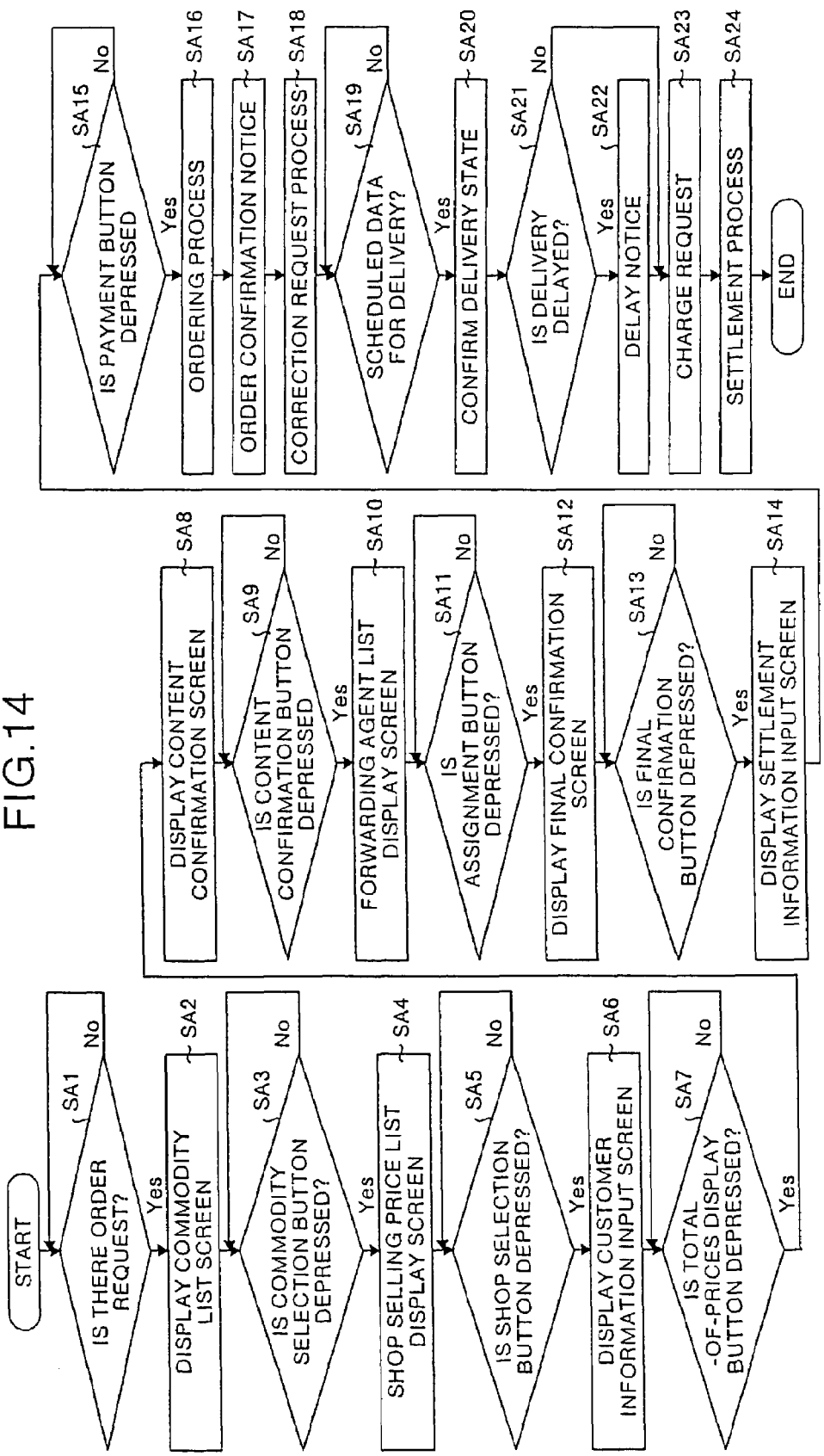
FIG. 14 is a flow chart for explaining an operation of the embodiment.

Returning FIG. 14, in step SA13, the main control unit 530 determines whether the final confirmation button 871 (see FIG. 22) is depressed or not. The main control unit 530 determines the result as "No", and repeats the determination until the final confirmation button 871 is depressed. After the customer confirms that order contents, customer information, and the like are correct by the final confirmation screen 870, the customer depresses the final confirmation button 871. In this manner, the main control unit 530 determines the result in step SA13 as "Yes". The main control unit 530 registers the transportation information in the transportation information database 690 (see FIG. 11).

In step SA14, the main control unit 530 displays a settlement information input screen 880 shown in FIG. 23 on the display unit of the customer client 100₁. The settlement information input screen 880 is a screen for causing a customer to input commodity settlement information (for example, credit card information of the customer). On the settlement information input screen 880, order commodity information 881, customer information 882, forwarding agent information 883, a settlement information input column 884, and a pay button 885 are displayed.

The settlement information input column 884 is a column for inputting the number of a credit card used by the customer to pay the price related to the order, the name of the credit card, and the term of validity.

Returning to FIG. 14, in step SA15, the main control unit 530 determines whether the pay button 885 (see FIG. 23) is depressed or not. The main control unit 530 determines the result as "No", and repeats the determination until the pay button 885 is depressed. When the pay button 885 is depressed after the settlement information is input to the settlement information input column 884, the main control unit 530 determines the result in step SA15 as "Yes".

In step SA16, the main control unit 530 stores the pieces of information in the order slip header information database 670 (see FIG. 9) and the order slip body information database 680 (see FIG. 10) on the basis of the settlement information input screen 880 (see FIG. 23). The main control unit 530 executes an ordering process of encoding and transmitting these pieces of information to, for example, the shop client 300₁, through the internet 200 as order information.

The main control unit 530 also encodes and transmits the customer information 882 and the forwarding agent information 883, shown in FIG. 23, to the shop client 300₁ through the internet 200. In this manner, in a shop (S store) corresponding to the shop client 300₁, an order slip, a transportation slip, and the like are formed on the basis of the received information, and classification of ordered commodities and a packaging operation are performed.

Returning to FIG. 14, in step SA17, the mail control unit 540 (see FIG. 1) forms the order confirmation mail 890 shown in FIG. 24 and transmits the order confirmation mail 890 to a customer (orderer) through the internet 200. The order confirmation mail 890 is an electronic mail notifying the customer of order contents, a total of prices, a delivery fee, settlement information, a scheduled date for delivery of the order, and the like to confirm the order.

Returning to FIG. 14, in step SA18, the main control unit 530 acquires transportation information related to the order from the transportation information database 690 (see FIG. 11), transmits the transportation information to, for example, the forwarding agent client 400₁ through the internet 200, and executes a correction request process of requesting collection of commodities of a shop. In this manner, in a forwarding agent corresponding to the forwarding agent client 400₁, the commodities are collected at the scheduled time and date for collection in the shop, and a transportation process is executed.

Returning to FIG. 14, in step SA19, the main control unit 530 determines whether today is the scheduled date for delivery with reference to the scheduled date for delivery shown in FIG. 11. If the scheduled date has not yet occurred, the main control unit 530 determines the result as "No" to repeat the decision. When the scheduled date for delivery of the commodity does occur, in step SA20, the main control unit 530 send an inquiry regarding the delivery state (the presence/absence of delay or the like) of the commodity to the forwarding agent client 400₁ through an electronic mail or the like before the scheduled time for delivery.

When the delivery state is on schedule, the forwarding agent client 400₁ notifies the commodity selling intermediation apparatus 500 that the delivery state is on schedule through an electronic mail or the like. On the other hand, if there is a delay regarding the scheduled time for delivery, the forwarding agent client 400₁ notifies the commodity selling intermediation apparatus 500 of a reason for delay, and the latest scheduled time for delivery, through an electronic mail.

In step SA21, on the basis of the electronic mail from the forwarding agent client 400$_1$, the main control unit 530 determines whether delivery of a commodity to be delivered today is delayed or not. When the decision result is "No", the process in step SA23 is executed.

On the other hand, when the determination result in step SA21 is "Yes", in step SA22, the mail control unit 540 forms a delivery delay mail 895, as shown in FIG. 25, in which a letter of apology, a reason for delay of delivery, and the latest scheduled time and date for delivery are described, and transmits the delivery delay mail 895 to the customer client 100$_1$ through the internet 200. When the delivery delay mail 895 is received by the customer client 100$_1$, the customer recognizes that the delivery is delayed, and also learns the updated time and date for delivery. When the commodity is delivered to the customer, the forwarding agent client 400$_1$ notifies the commodity selling intermediation apparatus 500 that the commodity is delivered to the customer through an electronic mail.

In step SA23, after the main control unit 530 recognizes the arrival of the commodity by the electronic mail, a request process is executed requesting a cost (total of the prices of commodities+transportation fee) related to the order of commodities from a credit company on the basis of the settlement information (credit card information) input by the customer. In step SA24, the main control unit 530 executes a payment process of paying the transportation fee to the forwarding agent.

As described above, according to this embodiment, with reference to commodity selling prices (see the shop commodity information database 650) of a plurality of shops which sell commodities through the internet 200, totals of the prices of a plurality of commodities ordered by a customer are compared with each other between the shops and shown to the customer (see FIG. 17), and one shop is selected as a selling agent by the customer to place an order with the shop (see FIG. 17). For this reason, the totals of prices can be easily compared with each other between the plurality of shops, and the present invention can improve the facilities for the customer and can contribute to reductions of the purchase prices of the commodities.

Moreover, as shown in FIG. 17, since totals of prices are shown to a customer such that at least some of commodity selling prices of a plurality of commodities are concealed, an opportunity to reveal low prices as totals of prices can be given to shops independently of the differences between the commodity prices of the shops caused by the difference between commodity buying routes or selling strategies, and excessive low-price competition between the shops can be prevented.

Furthermore, as shown in FIG. 21, transportation fees of a plurality of forwarding agents related to transportation of a plurality of ordered commodities are compared with each other and shown to a customer, and one forwarding agent is selected as a transportation assignee by the customer. The transportation of the ordered commodities is assigned to the selected forwarding agent through the internet 200. For this reason, the customer can receive the merits of lower transportation fees.

Moreover, an inquiry regarding the delivery state of the commodity is sent to the forwarding agent through the internet 200 before the scheduled time and date for delivery of the commodity included in the order information. When the delivery schedule is changed, the customer is notified that the delivery schedule is changed through the internet 200. For this reason, a notice is made only when notification regarding a situation such as delayed delivery must be given to the customer, and the quality of customer service can be improved.

Furthermore, commodity selling price information, which is transmitted from the commodity selling intermediation apparatus 500 in accordance with order information transmitted to the commodity selling intermediation apparatus 500, and which has at least some of the individual process of the plurality of commodities concealed, and the totals of the prices of the plurality of commodities are received by the customer client 100$_1$. As shown in FIG. 15, the received commodity selling prices in which some of the individual prices of the plurality of commodities are concealed, and the totals of the prices are shown, are displayed on the display unit (not shown) of the customer client 100$_1$. For this reason, an opportunity to reveal low prices as totals of prices can be given to shops independently of the differences between the individual commodity prices of the shops caused by the difference between commodity buying routes or selling strategies, and excessive low-price competition between the shops can be prevented.

Although this embodiment according to the present invention has been described above with reference to the accompanying drawings, the claimed invention is not limited to this embodiment, and changes in design or the like which are made without departing from the spirit and scope of the present invention is included in the present invention.

Types of services provided by this invention are not limited to the tangible goods as explained in this embodiment, but may include, for example, combinations of services such as modes of transportation and accommodations. If, for instance, travel including a combination of transportation and accommodations is selected as one of the services, a client can specify a transportation mode such as a train or an airplane, and can further specify, for example, a limited express if traveling by train. The client can also specify accommodations of any class and a location thereof. When one of such services is selected, tickets, coupons, or some other related documents are delivered to the client to utilize the service. The ticket or the like may be provided with an ID number to identify the ticket, or the ticket may be transmitted to the client in an electronic manner.

Figure 26:
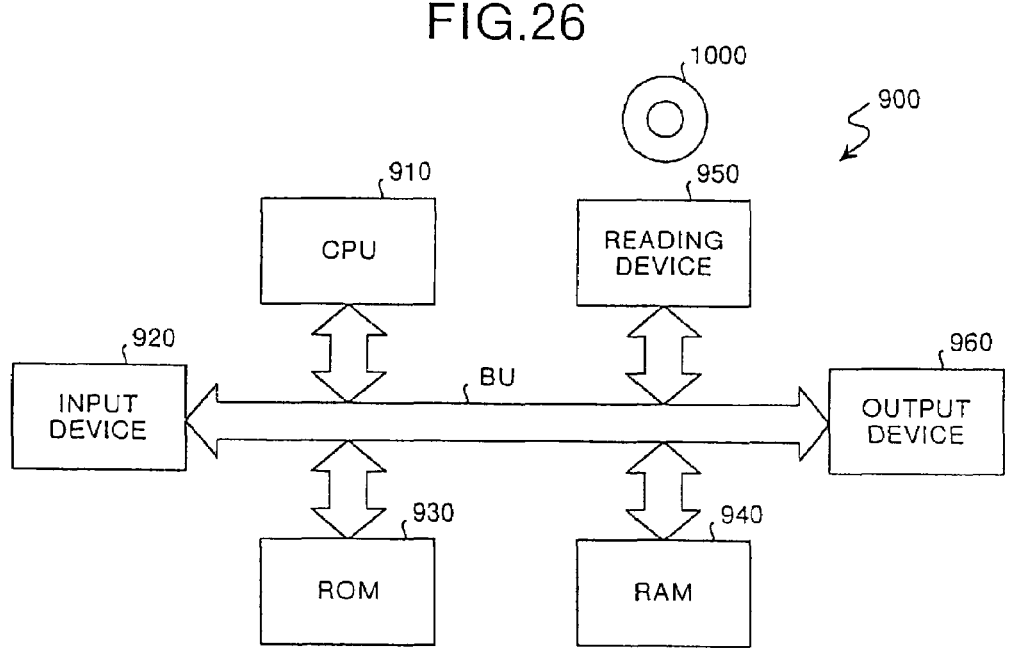
FIG. 26 is a diagram showing the configuration of a modification of the embodiment.

Also, for example, a commodity selling intermediation program for realizing the function of the commodity selling intermediation apparatus 500 described above may be recorded on a computer readable recording medium 1000 as shown in FIG. 26, and the commodity selling intermediation program recorded on the recording medium 1000 may be loaded on a computer 900 as shown in FIG. 26 and executed, so that the function of the commodity selling intermediation apparatus 500 may be realized.

The computer 900 shown in FIG. 26 is constituted by a CPU 910 for executing the commodity selling intermediation program, an input device 920 such as a keyboard or a mouse, a ROM (Read Only Memory) 930 for storing various data, a RAM (Random Access Memory) 940 for storing operation parameters or the like, a reading device 950 for reading the commodity selling intermediation program from the recording medium 1000, an output device 960 such as a display or a printer, and a bus BU for connecting these components to each other.

The CPU 910 loads the commodity selling intermediation program recorded on the recording medium 1000 through the reading device 950 and executes the commodity selling intermediation program to execute a series of processes related to the intermediation of commodity sales. The recording medium 1000 includes a portable recording medium such as an optical disk, a floppy disk, or a hard disk as a matter of course, and also includes a transmission medium such as a network for temporarily recording and holding data.

As has been described above, according to the present invention, with reference to commodity selling prices of a plurality of shops which sell commodities, totals of the prices of a plurality of commodities ordered by a customer are compared with each other between the shops and shown to the customer, and one shop is selected as a selling agent by the customer to place an order placed with the shop. For this reason, the totals of prices can be easily compared with each other between the plurality of shops, and the present invention can advantageously improve the facilities for the customer and contribute to reductions of the purchase prices of the commodities.

Moreover, since commodity selling prices of a plurality of commodities are shown to a customer such that at least some of the commodity selling prices are concealed, an opportunity to reveal low prices as totals of prices can advantageously be given to shops independently of the differences between the individual commodity prices of the shops caused by the difference between commodity buying routes or selling strategies, and excessive low-price competition between the shops can be advantageously prevented.

Furthermore, transportation fees of a plurality of forwarding agents related to transportation of a plurality of ordered commodities are compared with each other and shown to a customer, and one forwarding agent is selected as a transportation assignee by the customer. Transportation of the ordered commodities is assigned to the selected forwarding agent through the network. For this reason, the customer can advantageously receive the merits of lower transportation fees.

Moreover, an inquiry regarding the delivery state of a commodity is sent to a forwarding agent through a network before the scheduled time and date for delivery of the commodity included in the order information. When the delivery schedule is changed, the customer is notified that the delivery schedule is changed. For this reason, a notice is made only when notification regarding a situation such as delayed delivery must be given to the customer, and the quality of customer service can be advantageously improved.

Furthermore, commodity selling prices which are transmitted from a server in accordance with order information transmitted to the server, and which have at least some of the individual prices of the plurality of commodities concealed, and the totals of the prices of the plurality of commodities, are received, and the received commodity selling prices which have some of the individual prices of the plurality of commodities concealed, and the totals of the prices, are displayed. For this reason, an opportunity to reveal low prices as totals of prices can be given to shops independently of the differences between the individual commodity prices of the shops caused by the difference between commodity buying routes or selling strategies, and excessive low-price competition between the shops can be advantageously prevented.

Although the invention has been described with respect to a specific embodiment for a complete and clear disclosure, the appended claims are not to be thus limited, but are to be construed as embodying all modifications and alternative constructions that may occur to one skilled in the art which fairly fall within the basic teaching herein set forth.

What is claimed is:

1. A method of commodity selling intermediation performed in a commodity selling intermediation apparatus using a commodity information database that stores commodity discrimination code for uniquely discriminating commodities of respective manufacturers, trade name, and manufacturer's recommended retail price which is information related to sticker prices determined by the manufacturer, and a shop commodity information database that stores shop code for discriminating shops from each other, the commodity discrimination code, and commodity selling prices, the method comprising the steps of:

receiving order information related to a plurality of commodities selected at a customer client, the order information including information for specifying the commodity discrimination code;

searching the shop commodity database for commodity selling prices of the plurality of commodities at a plurality of shops using commodity discrimination code as a key;

totaling the prices of the plurality of commodities searched using the commodity discrimination code as a key, at each of the shops; and controlling the customer client to display the totals at each of the shops such that the commodity selling prices of the plurality of commodities are also displayed along with manufacturer's recommended retail prices and a total thereof on the display screen at the customer client, wherein the commodity selling prices of the plurality of commodities are displayed such that at least a part of the commodity selling prices is concealed.

2. The method according to claim 1, further comprising the step of comparing transportation fees of the plurality of forwarding agents related to transportation of a plurality of ordered commodities and showing the transportation fees to the customer and causing the customer to select one forwarding agent as a transportation assignee, wherein in the ordering step, transportation business is assigned to the selected forwarding agent through the network.

3. The method according to claim 2, further comprising the step of inquiring the delivery state of the commodity from the forwarding agent through the network before scheduled time and date for delivery of the commodity included in the order information and, when delivery schedule is changed, notifying the customer that the delivery schedule is changed.

4. The method according to claim 1, further comprising the steps of:

transmitting order information related to the plurality of commodities designated by a customer to a server connected through a network;

receiving commodity selling prices which are transmitted from the server in accordance with the transmitted order information and which have a state in which at least some of the plurality of commodities are concealed and the totals of the prices of the plurality of commodities; and displaying the received commodity selling prices which have the state in which at least some of the plurality of commodities are concealed and the totals of the prices.

5. A method of commodity selling intermediation performed in a commodity selling intermediation apparatus using a commodity information database that stores commodity discrimination code for uniquely discriminating commodities of respective manufacturers, trade name, manufacturer code, and manufacturer's recommended retail price which is information related to sticker prices determined by the manufacturer, and a shop commodity information database that stores shop code for discriminating shops from each other, the commodity discrimination code, and commodity selling prices, the method comprising:

receiving order information on plurality of commodities chosen by a customer through a network, the order information including information for specifying the commodity discrimination code; and controlling the customer client to provide the customer with a respective total price of the commodities having identical commodity discrimination code from each of a plurality of shops by displaying a total price at each of the plurality of shops such that the commodity selling prices of the plurality of commodities having identical commodity discrimination code are displayed along with manufacturer's recommended retail prices and a total of the manufacturer's recommended retail prices on a display screen at the customer client, wherein the commodity selling prices of the plurality of commodities are displayed such that at least a part of the commodity selling prices is concealed.

6. The method of commodity selling intermediation of claim 1, further comprising the step of displaying a list of the commodities, including the trade name, and the manufacturer's recommended retail price for each of the commodities which are stored in the commodity information database, on a display screen at a customer client.

* * * * *

UNITED STATES PATENT AND TRADEMARK OFFICE
CERTIFICATE OF CORRECTION

PATENT NO.         : 7,451,101 B2
APPLICATION NO. : 10/201970
DATED              : November 11, 2008
INVENTOR(S)        : Yasuhiro Nishimura It is certified that error appears in the above-identified patent and that said Letters Patent is hereby corrected as shown below:

Title Page, Column 2 (below Primary Examiner), insert
--(74) *Attorney, Agent, or Firm*—Staas & Halsey LLP--.

Column 16, Line 34, change "wherein in" to --wherein, in--.

Column 17, Line 1, change "on plurality" to --on a plurality--.

Signed and Sealed this

Seventeenth Day of February, 2009

JOHN DOLL
*Acting Director of the United States Patent and Trademark Office*